US011030101B2

(12) United States Patent
Saidi et al.

(10) Patent No.: US 11,030,101 B2
(45) Date of Patent: Jun. 8, 2021

(54) CACHE STORAGE FOR MULTIPLE REQUESTERS AND USAGE ESTIMATION THEREOF

(71) Applicant: ARM Limited, Cambridge (GB)

(72) Inventors: Ali Saidi, Austin, TX (US); Prakash S. Ramrakhyani, Austin, TX (US)

(73) Assignee: ARM Limited, Cambridge (GB)

(*) Notice: Subject to any disclaimer, the term of this patent is extended or adjusted under 35 U.S.C. 154(b) by 696 days.

(21) Appl. No.: 15/208,816

(22) Filed: Jul. 13, 2016

(65) Prior Publication Data

US 2017/0024327 A1 Jan. 26, 2017

(30) Foreign Application Priority Data

Jul. 23, 2015 (GB) .................................... 1513044

(51) Int. Cl.
*G06F 12/00* (2006.01)
*G06F 12/0811* (2016.01)
*G06F 12/126* (2016.01)
*G06F 12/128* (2016.01)
*G06F 12/122* (2016.01)
*G06F 12/123* (2016.01)

(52) U.S. Cl.
CPC ........ *G06F 12/0811* (2013.01); *G06F 12/122* (2013.01); *G06F 12/123* (2013.01); *G06F 12/126* (2013.01); *G06F 12/128* (2013.01); *G06F 2212/1021* (2013.01); *G06F 2212/60* (2013.01)

(58) Field of Classification Search
CPC ............................................. G06F 12/121–128
See application file for complete search history.

(56) References Cited

U.S. PATENT DOCUMENTS

| 5,974,438 | A | 10/1999 | Neufeld | |
|---|---|---|---|---|
| 6,243,788 | B1 | 6/2001 | Franke et al. | |
| 6,578,065 | B1 | 6/2003 | Aglietti et al. | |
| 7,457,920 | B1 | 11/2008 | Kornegay et al. | |
| 9,047,225 | B1* | 6/2015 | Evans | G06F 12/121 |
| 2009/0006755 | A1* | 1/2009 | Illikkal | G06F 11/3409 |
| | | | | 711/126 |
| 2011/0010503 | A1* | 1/2011 | Yamamura | G06F 12/121 |
| | | | | 711/128 |
| 2011/0238919 | A1* | 9/2011 | Gibson | G06F 12/084 |
| | | | | 711/133 |
| 2012/0254550 | A1* | 10/2012 | Gaur | G06F 12/0888 |
| | | | | 711/138 |

(Continued)

*Primary Examiner* — Reginald G Bragdon
*Assistant Examiner* — Michael L Westbrook
(74) *Attorney, Agent, or Firm* — Leveque Intellectual Property Law, P.C.

(57) ABSTRACT

A cache memory and method of operating a cache memory are provided. The cache memory comprises cache storage that stores cache lines for a plurality of requesters and cache control circuitry that controls insertion of a cache line into the cache storage when a memory access request from one of the plurality of requesters misses in the cache memory. The cache memory further has cache occupancy estimation circuitry that holds a count of insertions of cache lines into the cache storage for each of the plurality of requesters over a defined period. The count of cache line insertions for each requester thus provides an estimation of the cache occupancy associated with each requester.

14 Claims, 5 Drawing Sheets

(56) References Cited

U.S. PATENT DOCUMENTS

| | | | |
|---|---|---|---|
| 2014/0040556 A1* | 2/2014 | Walker .................. | G06F 9/5016 711/130 |
| 2014/0173214 A1* | 6/2014 | Ramrakhyani ....... | G06F 12/126 711/135 |

* cited by examiner

CACHE STORAGE FOR MULTIPLE REQUESTERS AND USAGE ESTIMATION THEREOF

TECHNICAL FIELD

The present disclosure relates to data processing. More particularly it relates to a cache memory.

BACKGROUND

In a data processing system in which a data processing apparatus accesses data stored in a memory, a cache may be interposed between the data processing apparatus and the memory to store a subset of the data in the memory and allow faster access to that data than would be possible if the data was directly accessed in the memory. Moreover, it may be the case that more than one agent in the data processing system seeks access to data stored in the memory via the cache. This could be another data processing apparatus provided in parallel with the above mentioned data processing apparatus, or it could be the case that individual independent requests for access to data in the memory come from two different sources within one data processing apparatus, for example from two different software processes or from two different virtual machines being hosted by that data processing apparatus. In such a situation, these two sources of memory access requests may then compete for cache space, where each issues memory access requests which cause cache lines to be allocated into the cache. A situation may arise in which one requester causes notably more cache lines than another to be allocated into the cache or causes the eviction of one or more particular cache lines from the cache allocated on behalf of the other requester, making the data processing carried out by that other requester rather slow and inefficient, since data items to which it regularly needs access keep having to be retrieved from memory. Nevertheless, despite such asymmetry between two requesters in their usage and occupancy of a cache arising, it may be difficult to monitor the extent to which this asymmetry has developed. Cache lines may be stored with associated information indicating the owner (originating requester) of that cache line, and the cache may be responsive to a request to indicate the owner of a particular cache line, or to respond with information relating to the number of cache lines for any given owner, but these techniques are expensive in terms of the additional storage space which they require. Alternatively, the cache could be partitioned, but this essentially requires dividing the cache into ways which limits the number of requesters which can use the cache at once and has some adverse associativity effects.

SUMMARY

In one example embodiment there is a cache memory comprising cache storage to store cache lines for a plurality of requesters; cache control circuitry to control insertion of a cache line into the cache storage when a memory access request from one of the plurality of requesters misses in the cache memory; and cache occupancy estimation circuitry to hold a count of insertions of cache lines into the cache storage for each of the plurality of requesters over a defined period.

In another example embodiment there is a method of caching data comprising: storing cache lines for a plurality of requesters; in response to a memory access request from one of the plurality of requesters missing in the cache memory, controlling insertion of a cache line into the cache storage; and holding a count of insertions of cache lines into the cache storage for each of the plurality of requesters over a defined period.

In another example embodiment there is a cache memory comprising means for storing cache lines for a plurality of requesters; means for controlling insertion of a cache line into the cache storage in response to a memory access request from one of the plurality of requesters missing in the cache memory; and means for holding a count of insertions of cache lines into the cache storage for each of the plurality of requesters over a defined period.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

At least some embodiments provide a cache memory comprising cache storage to store cache lines for a plurality of requesters; cache control circuitry to control insertion of a cache line into the cache storage when a memory access request from one of the plurality of requesters misses in the cache memory; and cache occupancy estimation circuitry to hold a count of insertions of cache lines into the cache storage for each of the plurality of requesters over a defined period.

The cache memory of the present techniques is arranged to cache data (i.e. store cache lines) for multiple requesters. In other words, more than one device which can issue memory access requests is coupled to this cache memory (i.e. it is a shared cache). Note that the "data" which the cache memory stores could take any form, in particular this term being used herein to refer both to data values and to instructions. Moreover, the multiple requesters could also take a variety of forms, both physical and virtual, such as being made up from one or more different hardware data processing units such as CPUs and/or GPUs, one or more virtual machine being hosted by one of those devices or one or more software process running on a suitable processor, or any combination thereof. The cache memory of the present techniques is further provided with cache occupancy estimation circuitry which holds a count (i.e. stores a count value) of the number of cache line insertions which have been made for each of the plurality of requesters. This is done over a defined period. This period may be defined in a variety of ways (e.g. in terms of clock cycles) depending on the system requirements. The present techniques recognise that storing ownership information in association with each cache line inserted into the cache storage, i.e. labelling each cache line with its requester, is undesirably expensive in terms of the storage space (and hence physical area) which this requires. However, the present techniques further recognise that a useful estimation of the cache occupancy can be formulated by counting cache line insertions for each of the plurality of requesters. It is of course recognised that the number of cache line insertions for each requester will typically not directly represent the current occupancy of the cache storage (in terms of cache lines for each requester), since a continual process of cache line insertion and eviction takes place, but it is nevertheless recognised by the present techniques that this cache line insertion count gives a useful indication of the usage of the cache storage by each of the plurality of requesters, and can therefore be used in a variety of ways to modify the usage of the cache memory, such that the requirements of the data processing system as a whole (including both the plurality of requesters and the cache memory) is satisfied.

The information maintained by the cache occupancy estimation circuitry may be used in a variety of ways. For example, the cache memory may be responsive to an enquiry from one of the requesters to return one or more count values of cache line insertions, such that the requester can then make use of this information. The information may also be used within the cache memory itself in a variety of ways and in some embodiments the cache control circuitry is responsive to the cache storage having a full occupancy of cache lines to select a victim cache line for eviction from the cache storage in dependence on a retention policy, and wherein the cache control circuitry has biasing circuitry to bias the retention policy in dependence on the count of insertions held by the cache occupancy estimation circuitry. Thus the cache memory may have a retention policy which guides the victim cache line selection when the cache memory is fully occupied and therefore a victim cache line must be evicted in order to provide storage space for insertion of a new cache line following a cache miss. The cache memory, in such embodiments, can then use its biasing circuitry to bias the retention policy on the basis of the information held by the cache occupancy estimate circuitry, i.e. the counts of insertions of cache lines for the plurality of requesters. The retention policy may take a variety of forms and therefore the biasing of that retention policy may vary accordingly. However, to give just one example, the retention policy may comprise some variety of numerical ordering, wherein a value is associated with each stored cache line, and the retention policy then selects the victim cache line for eviction on the basis of the relative numerical values, for example selecting a victim cache line with the highest numerical value currently stored in the cache memory. The biasing of the retention policy in this manner thus enables the shared usage of the cache memory between the plurality of requesters to be influenced in a number of different ways that may be useful, depending on the particular data processing system in which the cache memory is to be found. For example, in a situation where two requesters (e.g. virtual machines, processing devices, software threads, etc.) are competing for cache space in the cache memory, and where one allocates many more lines than the other, this biasing technique allows the retention policy to be biased such that the "aggressive" requester will tend to replace its own cache lines (because at least some of these have been for example labelled with higher values, which means they are more likely to be selected as the victim cache line), rather than replacing cache lines belonging to other requesters (which can be given lower values). Accordingly, the "fairness" of the shared cache usage can be better supported. For example, the cache usage of a particular virtual machine may depend strongly on the data processing which it is carrying out and if one virtual machine is performing memory intensive data processing it may evict a majority of another less cache intensive virtual machine's lines from a shared cache such as last level cache. This can particularly be true when a least recently used (LRU) retention policy is defined. It is however not necessary for the retention policy to be biased such that different requesters have equal priority in using the cache, for example it may be desired for one requester to have greater usage of the cache than another, and the retention policy can be biased accordingly in order to allow this asymmetric usage of the cache. There may be a variety of reasons for this asymmetric usage to be desirable, whether because of the pure processing efficiency which derives from allowing one requester in the data processing system to make greater usage of the cache than another, or it may be for example the case that the hardware resources are virtualised and multiple virtual machines are running in the system, which have been allocated to different customers (in a situation where the processing resources of the data processing system are rented out). In this situation it may be desirable to bias the cache usage distribution between the virtual machines, in dependence on the service which should be provided to each customer for their own virtual machine.

As mentioned above, the retention policy may be implemented in a variety of ways, but in some embodiments the cache memory further comprises priority value storage to store a priority value in association with each cache line, wherein the cache control circuitry sets the priority value stored in association with a newly filled cache line in dependence on the count of insertions held by the cache occupancy estimation circuitry for the requester which issued the memory access request which caused the newly filled cache line. Thus by storing a priority value in association which each cache line a relative importance of that cache line (in terms of retention/eviction) can be defined and by using the count of insertions held by the cache occupancy estimate circuitry the likelihood of eviction for cache lines belonging to a particular requester can be influenced (biased) in order to achieve whichever usage goal in terms of shared cache usage is required.

In some embodiments the cache memory further comprises recent usage storage to store a recent usage value in association with each cache line, wherein the cache control circuitry sets the recent usage value stored in association with a newly filled cache line in dependence on the count of insertions held by the cache occupancy estimation circuitry for the requester which issued the memory access request which caused the newly filled cache line, and wherein the victim cache line is selected in dependence on the recent usage values stored in the recent usage storage. The storage of recent usage values may for example correspond to the above mentioned LRU retention policy, according to which the victim cache line is typically selected as that cache line which has been "least recently used", and normally the recent usage value stored in association with a newly filled cache line would indicate that this is the "most recently used" (MRU) cache line. However the present techniques allow this recent usage value to be varied in dependence on the count of insertions held by the cache occupancy estimation circuitry for the corresponding requester, and therefore by effectively slotting this newly filled cache line in at a position in the spectrum of recent usage which is biased towards the LRU end (and away from the MRU end), the desired biasing of the shared cache usage can be achieved.

As mentioned above, the goal which the biasing of the retention policy seeks to achieve may take a variety of forms, but in some embodiments when the count of insertions for a first requester of the plurality of requesters is higher than the count of insertions for a second requester of the plurality of requesters, the biasing of the retention policy comprises biasing selection of the victim cache line towards selection of a cache line associated with the first requester over selection of a cache line associated with the second requester. Accordingly, just considering the relative usage of the cache for a first and second requester, the biasing of the retention policy may be implemented in a manner in which "fair" sharing of the cache between the first and second requester is targeted, by biasing selection of the victim cache line towards those cache lines belonging to the requester with a count of insertions which is currently higher than the other requester.

The biasing may however be differently defined, and in some embodiments the cache control circuitry comprises target cache usage storage to hold at least one target value for usage of the cache lines by at least one requester of the plurality of requesters, and wherein the biasing of the retention policy comprises biasing selection of the victim cache line to reduce a difference between the count of insertions of cache lines into the cache storage and the at least one target value for usage of the cache lines. The target cache usage storage thus enables the shared cache usage to be configured, whether this is with the goal of simply making the shared cache usage between the plurality of requesters "fair", i.e. where each requester has equal usage of the cache and should, on average, have approximately the same number of cache lines held in the cache storage as any other requester, or this may be defined such that a desired asymmetry in the cache usage can be achieved. The target cache usage storage has a configuration allowing at least one target value to be stored, and accordingly, there may only be one target stored for one requester, for example to ensure that a minimum amount of cache storage is maintained for this requester, or target values for more than one requester may be defined, so that respective target cache usage for each of the requesters which have a target value defined can be achieved. The biasing of the retention policy may be performed in terms of the relative values of more than one target value, for example such as a ratio between two target values, which may for example allow one requester to use twice as much cache storage as another, regardless of the specific number of cache lines typically used by each requester.

The cache control circuitry may also be configured to bias the retention policy in dependence on further information which it receives and in some embodiments the cache control circuitry is responsive to at least one performance metric received from at least one of the plurality of requesters to bias the retention policy in dependence on the at least one performance metric. Thus one or more of the plurality of requesters can provide the cache memory with information relating in some manner to its performance, quantified by the corresponding performance metric, and this information can be used by the cache control circuitry to seek to achieve a particular cache usage model, through biasing the retention policy. The particular performance metric or metrics received may take a variety of forms, but may for example be indications of processing time (e.g. CPU hours) which, in a defined time period, have been clocked up by each of a number of virtual machines which share a CPU. The shared cache usage can thus be biased to correspond to the shared usage of the CPU in such an example, or indeed may be biased to influence the CPU hours, by variation of the shared cache usage.

As mentioned above, more than one performance metric may be received, and in some embodiments the cache control circuitry is responsive to two performance metrics received from two of the plurality of requesters to bias the retention policy to seek to modify a ratio of the two performance metrics. To the extent that the particular performance metrics under consideration can be influenced by the manner in which the cache responds to their memory access requests (for example processing tasks can be accelerated by allowing greater cache usage or slowed down by only allowing less cache usage) then the cache control circuitry can seek to modify a ratio of the two performance metrics.

The manner in which the count of insertions is maintained and used relative to the defined period may take a variety of forms in dependence on the particular system requirements, but in some embodiments the biasing circuitry is responsive to an elapse of the defined period to update the retention policy in dependence on the count of insertions held by the cache occupancy estimation circuitry. Accordingly, the retention policy (for example in terms of a particular value held in association with each stored cache line) can be updated at the elapse of each iteration of the defined period (or "epoch"). The retention policy may be updated on the basis of the count of insertions over the epoch in various ways, for example during a subsequent epoch the retention policy may be updated based on the count(s) made in a previous epoch. In another example the retention policy may be updated at the end of a given epoch based on the count(s) made in that epoch.

In some embodiments the biasing circuitry is responsive to the elapse of the defined period to update the retention policy in dependence on an average count of insertions determined with respect to a plurality of counts of insertions counted over a multiple of the defined period. Accordingly, instead of using the counts of insertions over a single epoch, the biasing circuitry may be arranged to determine an average count of insertions, such as a moving average determined over a last previous set of epochs. Averaging the count over multiple epochs allows a degree of smoothing to be achieved, which may be desirable in dependence on the particular system requirements.

The biasing circuitry may also take the particular requester into account when biasing the retention policy, whether this is in terms of the physical device corresponding to the requester (e.g. a CPU or GPU) or whether this is a particular virtual machine or software process hosted by a specific device, and accordingly in some embodiments the biasing circuitry is responsive to a type of requester when biasing the retention policy to further bias the retention policy in dependence on a type of at least one of the plurality of requesters. Accordingly, a particular type of requester can, say, be prioritised over another.

The cache memory may be provided in a variety of ways in a data processing system and in particular any different cache level in a memory hierarchy, and in some embodiments the cache memory is provided to form part of a cache memory hierarchy with at least one further cache memory interposed between the plurality of requesters and the cache memory. In other words, the cache memory may be provided as a level two (or higher) cache within a cache memory hierarchy. Indeed, in some embodiments the cache memory is arranged to be provided as a last level cache (e.g. level three) within a cache memory hierarchy.

At least some embodiments provide a method of caching data comprising storing cache lines for a plurality of requesters; in response to a memory access request from one of the plurality of requesters missing in the cache memory, controlling insertion of a cache line into the cache storage; and holding a count of insertions of cache lines into the cache storage for each of the plurality of requesters over a defined period.

At least some embodiments provide a cache memory comprising means for storing cache lines for a plurality of requesters means for controlling insertion of a cache line into the cache storage in response to a memory access request from one of the plurality of requesters missing in the cache memory; and means for holding a count of insertions of cache lines into the cache storage for each of the plurality of requesters over a defined period.

Some particular embodiments are now described with reference to the figures.

Figure 1:
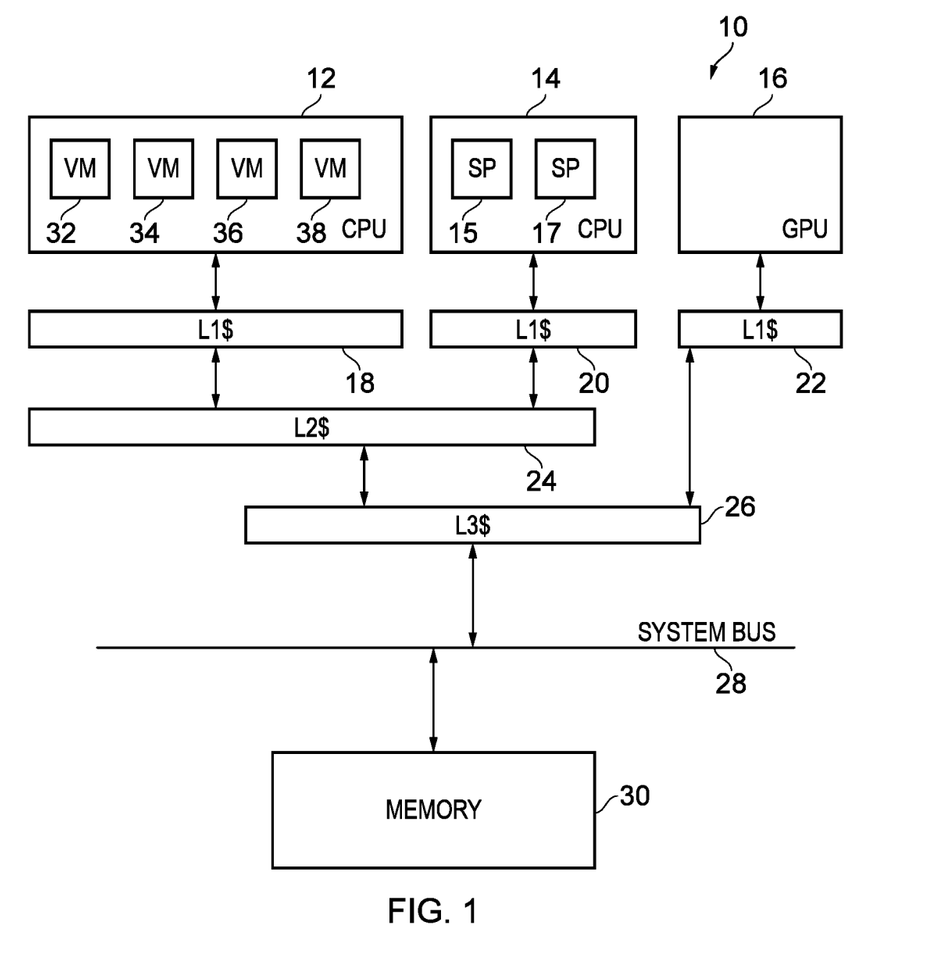
FIG. 1 schematically illustrates a data processing system in which a memory hierarchy comprises at least one cache memory according to the present techniques.

FIG. 1 schematically illustrates a data processing system 10 in one embodiment. The data processing system 10 comprises three data processing devices, namely CPU 12, CPU 14 and GPU 16. Each of these processing devices is provided with a respective level 1 cache, namely level 1 caches 18, 20 and 22. The CPUs 12 and 14 share a level 2 cache 24 and all data processing devices share a last level cache, namely level 3 cache 26. The caches therefore form a cache memory hierarchy, leading to the memory 30 via the system bus 28. Any of the caches illustrated in FIG. 1 may be configured according to the present techniques, and within the example of FIG. 1 the level 3 cache 26 comprises cache control circuitry and cache occupancy estimation circuitry, which will be described in more detail with reference to the following figures. Note also from FIG. 1 that CPU 12 is shown as hosting four virtual machines 32, 34, 36 and 38. In fact, CPU 12 is capable of hosting many more such virtual machines, but for simplicity of illustration only four are explicitly shown in FIG. 1. Also, CPU 14 is shown as running two independent software processes (SPs) 15 and 17. Only two concurrent software processes are shown for clarity of illustration, but (many) more could be run by any of the three data processing devices 12, 14 and 16. Thus, in terms of issuing memory accesses for data (recalling that this may mean data values or instructions) to the memory hierarchy formed by the cache memory hierarchy and the memory 30 itself, any of the processing devices 14 and 16, the virtual machines 32-38 or the software processes 15 and 17 may be considered as a requester, which can issue a memory access request.

Figure 2:
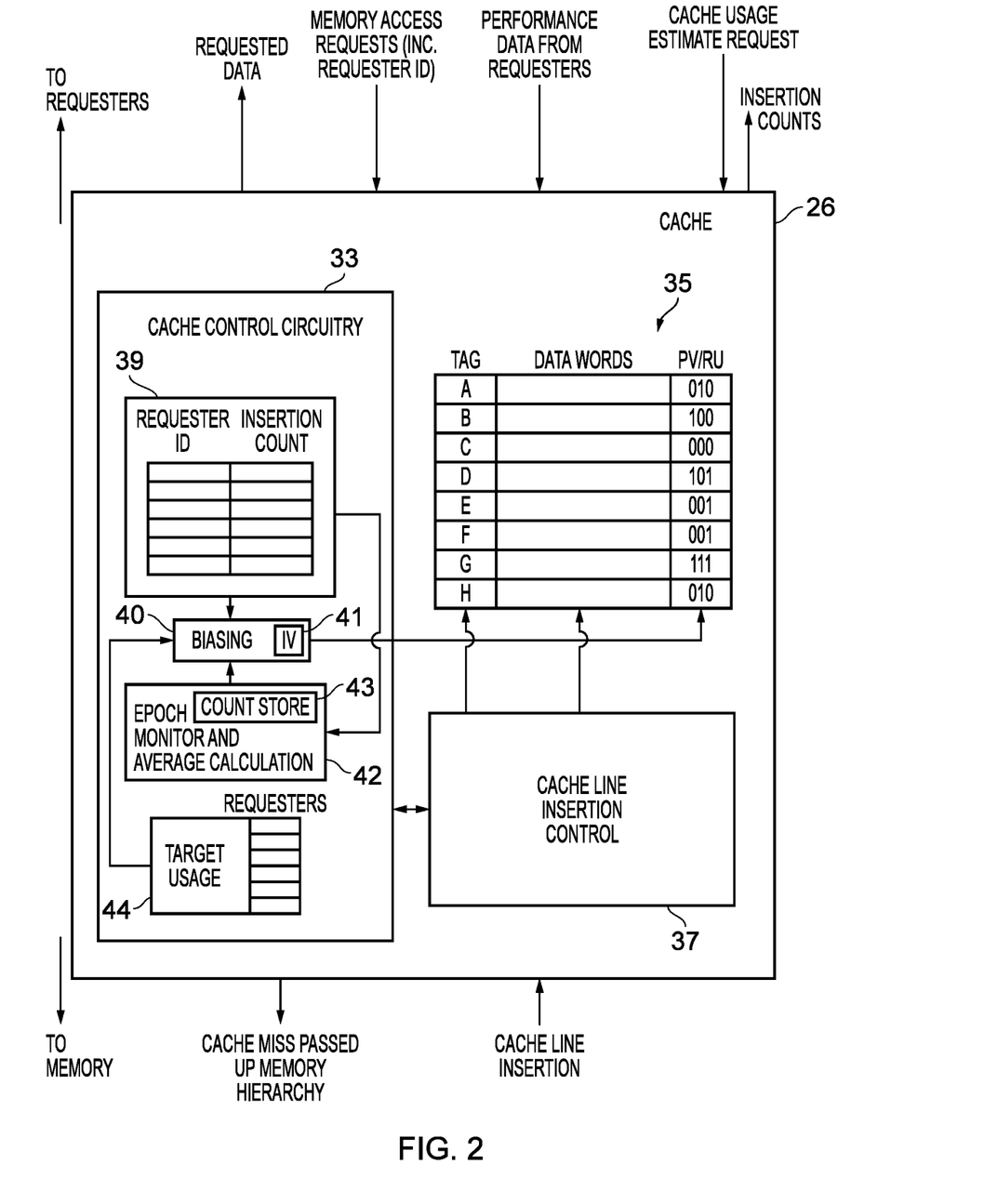
FIG. 2 schematically illustrates in more detail the configuration of a cache memory in one embodiment.

FIG. 2 schematically illustrates in more detail the internal configuration of the level 3 cache 26 shown in FIG. 1. This cache comprises cache control circuitry 33, cache storage 35 and cache line insertion control circuitry 37. In general, in a manner which will be familiar to the skilled person, the cache is responsive to memory access requests to perform a lookup procedure with respect to the cache lines stored in the cache storage 35 in order to determine whether the requested data is currently stored within one of the cache lines. When it is, i.e. when a cache hit occurs, then that memory access request can be serviced directly from the cache 26. However, when the requested data is not currently stored in a cache line of the cache storage 35, i.e. a cache miss occurs, then this memory access request is passed up in the memory hierarchy, and in the particular case of the level 3 cache 26, this means that the memory access request is passed, via the system bus 28, to the memory 30. When the requested data is returned from the memory 30, the cache 26 makes use of its cache line insertion control circuitry 37 to store a corresponding cache line into the cache storage 35, and for this purpose, when the cache storage 35 is currently fully occupied (which it will be almost all of the time in normal operation) the cache line insertion control 37 selects a victim cache line to be replaced by the incoming new cache line.

The cache control circuitry 33 comprises cache occupancy estimation circuitry 39, biasing circuitry 40, epoch monitor and average calculation circuitry 42 and target usage storage circuitry 44. When the cache line insertion control 37 causes a new cache line to be inserted into the cache storage 35, the cache occupancy estimation circuitry 39 updates the values it stores, namely a requester ID and an insertion count. In other words, for each requester which has issued a memory access request which has been received by cache 26, has missed therein, and has caused a cache line to be inserted, the circuitry 39 maintains an insertion count for that requester ID. The cache control circuitry 33 maintains the counts over a predetermined period (an epoch) and then resets the insertion counts to zero at the end of each epoch. The biasing circuitry 40 of the cache control circuitry 33 makes use of the insertion counts stored in cache occupancy estimation circuitry 39 in order to determine a value stored in association with a given cache line and labelled PV/RU in FIG. 2. This labelling indicates that the value stored in association with each cache line may be considered to be a priority value (PV) or a recent usage (RU) value, in dependence on the particular system configuration and the interpretation of the value stored.

In the example shown in FIG. 2, the PV/RU values are 3-bit values representing a range of different priorities with respect to the replacement policy implemented by the cache line insertion control in terms of the victim cache line which it selects. Thus, when operating in a configuration in which victim cache line selection is performed to select the least recently used cache line, then the corresponding RU values indicate (subject to the biasing discussed below) how recently the corresponding cache line was inserted. For example, in the snap shot of values shown in FIG. 2, the cache line labelled with tag C represents the most recently used (inserted) cache line, whilst the cache line labelled with tag G has been least recently used. These values can be updated as the corresponding cache lines are used (or not), e.g. decreasing the value for a cache line when it is used and/or increasing the value for another cache line which is not used. Alternatively, in a configuration which the cache 26 uses the associated values to indicate priorities (PV) associated with each cache line, the snapshot of values shown in FIG. 2 represent a range of priorities, wherein the cache line labelled with tag G (having PV=111) is the least important cache line (and therefore would be the most likely to be selected as the cache line victim) whilst the cache line labelled with tag C (having PV=000) is the most important and is the least likely to be selected as the victim cache line.

Thus, in the absence of the operation of the biasing circuitry 40, a newly inserted cache line would be marked as the most recently used cache line according to the RU scheme, or would be given a priority value (PV) in accordance with a defined retention policy, which may for example distinguish between the requester associated with the corresponding memory access request and/or the type of data stored (e.g. whether this is a data value or an instruction). However, the present techniques provide the biasing circuitry 40 in order to make use of the count values stored in the cache occupancy estimation circuitry 39 to bias this retention policy. For example, when the cache 26 is operating in a mode where the cache lines are marked with a "recent usage" value then instead of marking a newly inserted cache line as most recently used, the biasing circuitry 40 can cause that newly inserted cache line to be marked with a RU value which deviates therefrom, i.e. this newly inserted cache line can be marked with an RU value which indicates that this cache line lies elsewhere on the spectrum of recent usage from least recently used to most recently used. This thus causes this particular cache line to be more likely to be selected as the victim cache line than it would be in the absence of the biasing provided by the biasing circuitry 40. The same principle applies to when the cache 26 is operating in a configuration where the associated values are the priority values PV, and the biasing circuitry 40 influences the selected priority value stored in association with a newly inserted cache line to raise (or lower as appropriate) the relative priority of this newly inserted cache line, such that it may be more (or less) likely to be selected as the victim cache line. The biasing circuitry 40 has initial value (IV) storage 41 which holds a set of initial PV/RU values which give a PV/RU value to be used when a cache line is inserted for a given requester, and the biasing circuitry can bias these value on the basis of the insertion counts.

The biasing circuitry 40 can perform its biasing with reference to either or both of the epoch monitor and average calculation circuitry 42 and the target usage storage circuitry 44. The epoch monitor 42 defines the period over which insertion counts are maintained Thus, the epoch monitor 42 determines when the defined period over which the insertion counts are maintained have elapsed and then indicates the elapse of the epoch to the biasing circuitry 40, such that it can update the manner in which is biases the PV/RU values accordingly. The epoch monitor 42 can further monitor the insertion counts over more than one epoch and calculate an average insertion count for each requester ID over a predetermined number of epochs. Counts from previous epochs, to support this calculation, are stored in the count storage 43. This information can also be passed to the biasing circuitry 40 for it to configure the manner in which is biases the PV/RU values. The cache control circuitry 33 also comprises the target usage storage 44, which has storage to store a target usage value for each of the requesters which make use of this cache. In one configuration this target usage storage is switched off, or at least its communication with the biasing circuitry 40 is switched off, such that the biasing circuitry simply seeks to ensure that "fair" usage of the cache storage 35 is made in terms of the allocation of cache lines for the multiple requesters, i.e. that on average each requester has an equivalent number of cache lines in the cache storage 44. However, the cache control circuitry 33 can also operate in a configuration in which communication between the target usage storage 44 and biasing circuitry 44 is enabled and in which a target usage value for each requester stored in the target usage storage 44 is passed to the biasing circuitry 40, such that when it seeks to bias the retention policy implemented by the cache in terms of controlling the cache line insertion, the biasing can be performed to seek to achieve this target usage. These target usage values stored in the target usage storage 44 may be fixed, or may be updated by one of the processing devices (such as processing devices 12, 14 or 16) in FIG. 1. In addition, each of the requesters can provide the cache 26 with performance data relating to its own performance, providing a performance metric relevant to the cache usage. The cache control circuitry 33 can modify the target usage values stored in dependence on the performance metrics received from the requesters, so that the biasing of the retention policy may be performed to seek to adjust one or more of the performance metrics. The cache control circuitry 33 is also responsive to a request received from one of the requesters to provide one or more insertion counts in response. As such, this may be seen as a cache usage estimation request to which the cache control circuitry responds by providing the set of insertion counts stored, so that the recipient can derive an estimation of the usage of the cache storage 35 on the basis of these values.

Figure 3:
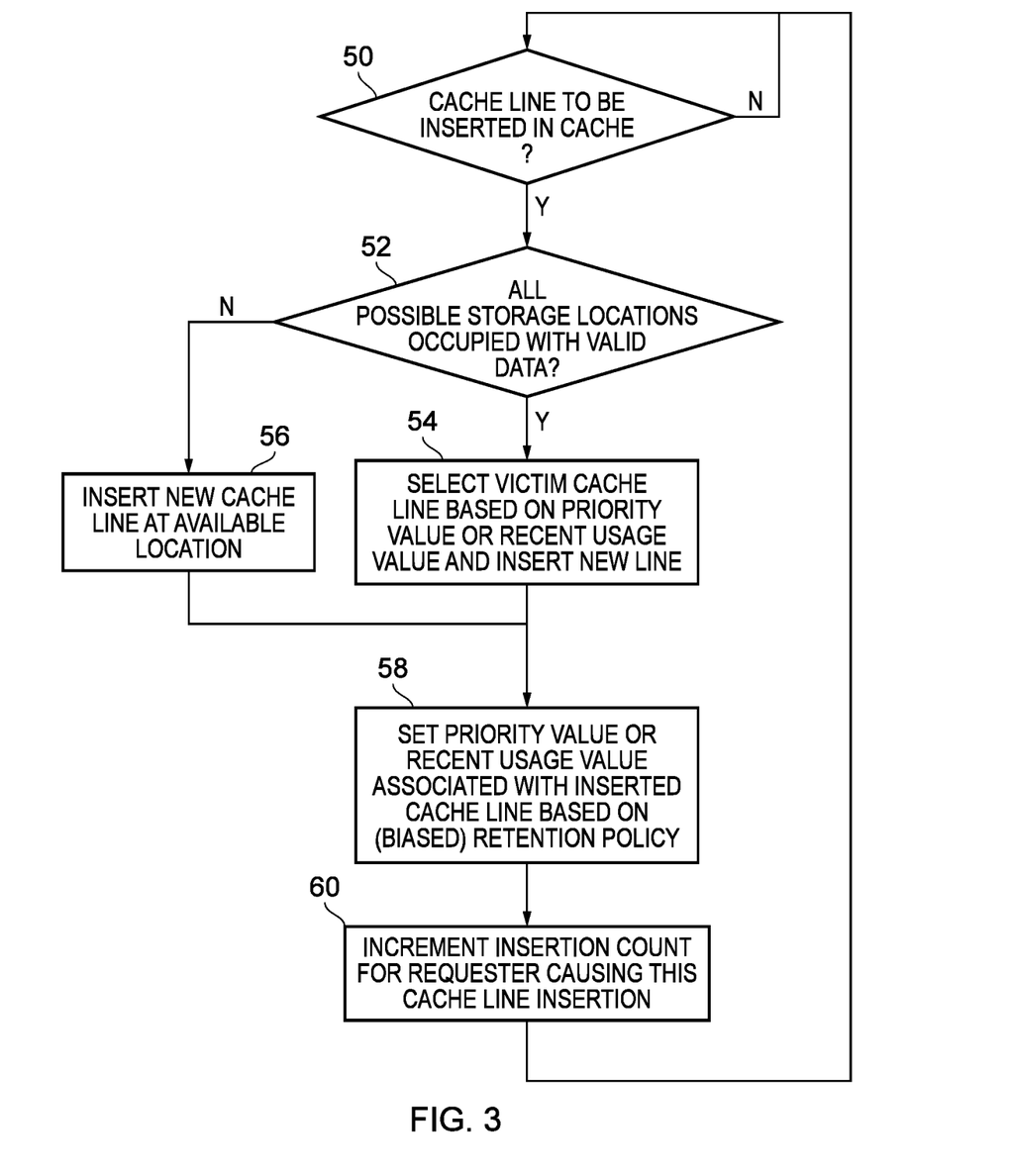
FIG. 3 shows a sequence of steps which are taken when a cache line is inserted into a cache in one embodiment.

FIG. 3 shows a sequence of steps which in one embodiment are carried out in the operation of a cache memory such as cache memory 26 shown in FIG. 2. The flow can be considered to begin at step 50, where it is determined if a cache line is to be inserted into the cache (i.e. if cache miss has occurred resulting in a cache line being retrieved from memory). Whilst this is not the case the flow waits at step 50. When a new cache line should be inserted, the flow proceeds to step 52 where it is determined if the cache storage currently has full occupancy, i.e. if all cache lines in which this new cache line could be stored are currently occupied with valid data. In the case of a fully associative cache a new cache line could in principle be stored in any available cache line storage, but more commonly a cache is set-associative, and the set of possible storage locations for a given cache line will only be a subset of all possible storage locations. If this is not true, i.e. at least one cache line storage location is available, then at step 56 the new cache line is inserted into the available location. Otherwise, if the cache storage is fully occupied, then at step 54 a victim cache line is selected, based on the priority value (PV) or recent usage value (RU), depending on the current configuration of the cache, and the new cache line is inserted to replace that victim cache line. Then at step 58 the PV or RU value is set for the newly inserted cache line based on the biased retention policy which the cache control circuitry is currently administering. As described above, this may comprise varying this value in order to achieve a fairer usage of the cache, or to achieve a particular target usage of the cache. Then at step 60 the insertion count held for the relevant requester is incremented and the flow returns to step 50.

Figure 4:
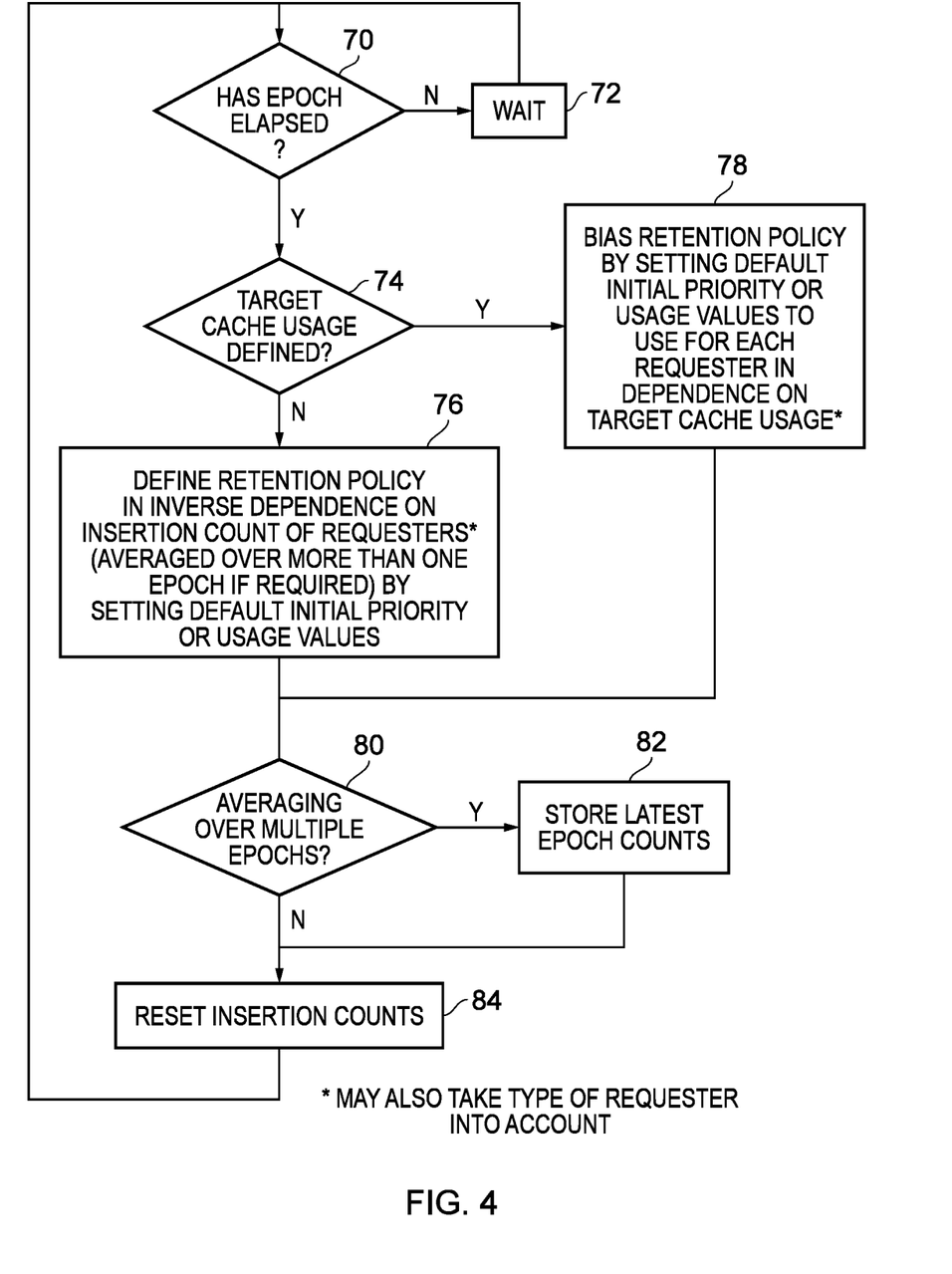
FIG. 4 shows a sequence of steps which are taken to bias a cache retention policy in one embodiment.

FIG. 4 shows a sequence of steps which are carried out when operating a cache such as cache 26 shown in FIG. 2 in one embodiment. The flow can be considered to begin at step 70, where it is determined if a epoch has elapsed. Whilst it has not the flow loops via step 72 (implementing an appropriate delay) until such an epoch does elapse. Then at step 74 it is determined if target usage values for the cache are defined and active. If they are not the flow proceeds to step 76 where the biasing mechanism provided for the cache (i.e. in the example of FIG. 2 that of the biasing circuitry 40) is configured to implement a retention policy which is in inverse dependence on the insertion counts maintained for the multiple requesters which use this cache. These insertion counts may be only over the most recent epoch, or may be over a number of recent epochs such that the usage is averaged out over that number of epochs. This is done by setting default initial priority or usage values (PV/RU) to be used for each of the requesters. Note also as indicated in FIG. 4 that the retention policy may take the type of requester into account and hence rather than simply ensuring fair (equal) usage of the cache the retention policy may be defined to allow some types of requester greater usage of the cache than others. If however (at step 74) it is determined that target cache usage values are defined and enabled then the flow proceeds via step 78 where the retention policy implemented is biased by setting up the retention policy (i.e. biasing the PV/RU initial values) so that PV or RU values to use for each requester for a newly inserted cache line are varied in dependence on the relevant target usage value held. Accordingly, where the target usage value indicates that a given requester should be afforded greater cache usage, the initial PV/RU values are biased so that it is less likely that the corresponding cache line inserted for this requester will be evicted, and conversely where the target usage value for a particular requester indicates that this requester should be accorded less usage of the cache the initial PV/RU values are biased to make it more likely (on average) that a cache line associated with this requester will be selected as the victim cache line when a new cache line should be inserted. Again, as indicated by the figure, this may also take into account the type of requester. Next at step 80 it is determined if the cache usage is being averaged over the multiple epoch and where it is the flow goes via step 82 where the counts for the latest epoch are stored and then at step 84 the insertion counts held are reset and the flow returns to step 70 as a new epoch begins.

Figure 5:
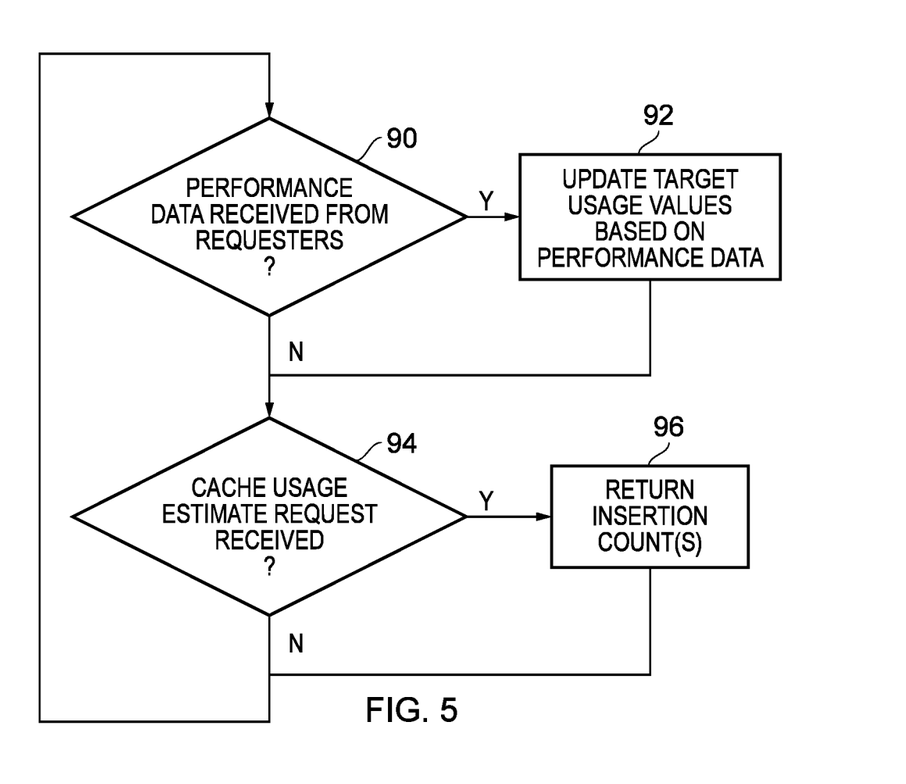
FIG. 5 shows a sequence of steps which are taken when operating a cache memory in one embodiment.

FIG. 5 illustrates a sequence of steps which are carried out when operating a cache memory device such as the cache 26 of FIG. 2, in one embodiment. At step 90 it is determined if performance data has been received from the requesters (or at least one requester) in the form of a performance metric. When such performance data has been received then at step 92 the target usage values are updated based on this performance data. Then at step 94 it is determined if a cache usage estimate request has been received from one of the requesters and when it has at step 96 the insertion count(s) requested are returned to that requester to provide a cache occupancy estimation. The flow then returns to step 90. Considering FIGS. 3, 4 and 5 together, it should be appreciated that these flows, whilst illustrated independently, will typically be each running at the same time with new cache lines being inserted as appropriate (FIG. 3), epochs being monitored and the retention policy being defined (biased) at the end of each epoch (FIG. 4) and the cache being responsive to performance data received or cache usage estimate requestes (FIG. 5).

In brief overall summary, a cache memory and method of operating a cache memory are provided. The cache memory comprises cache storage to store cache lines for a plurality of requesters and cache control circuitry to control insertion of a cache line into the cache storage when a memory access request from one of the plurality of requesters misses in the cache memory. The cache memory further has cache occupancy estimation circuitry to hold a count of insertions of cache lines into the cache storage for each of the plurality of requesters over a defined period. The count of cache line insertions for each requester thus provides an estimation of the cache occupancy associated with each requester.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A cache memory comprising:
cache storage configured to store cache lines for a plurality of requesters;
cache control circuitry that controls insertion of a cache line into the cache storage when a memory access request from one of the plurality of requesters misses in the cache memory; and
cache occupancy estimation circuitry configured to hold a count of insertions of cache lines into the cache storage for each of the plurality of requesters over a defined period.

2. The cache memory as claimed in claim 1, wherein the cache control circuitry is responsive to the cache storage having a full occupancy of cache lines to select a victim cache line for eviction from the cache storage in dependence on a retention policy, and wherein the cache control circuitry has biasing circuitry to bias the retention policy in dependence on the count of insertions held by the cache occupancy estimation circuitry.

3. The cache memory as claimed in claim 1, further comprising priority value storage configured to store a priority value in association with each cache line, wherein the cache control circuitry sets the priority value stored in association with a newly filled cache line in dependence on the count of insertions held by the cache occupancy estimation circuitry for the requester which issued the memory access request which caused the newly filled cache line.

4. The cache memory as claimed in claim 1, further comprising recent usage storage configured to store a recent usage value in association with each cache line, wherein the cache control circuitry sets the recent usage value stored in association with a newly filled cache line in dependence on the count of insertions held by the cache occupancy estimation circuitry for the requester which issued the memory access request which caused the newly filled cache line,
and wherein the victim cache line is selected in dependence on the recent usage values stored in the recent usage storage.

5. The cache memory as claimed in claim 2, wherein, when the count of insertions for a first requester of the plurality of requesters is higher than the count of insertions for a second requester of the plurality of requesters,
the biasing of the retention policy comprises biasing selection of the victim cache line towards selection of a cache line associated with the first requester over selection of a cache line associated with the second requester.

6. The cache memory as claimed in claim 2, wherein the cache control circuitry comprises target cache usage storage configured to hold at least one target value for usage of the cache lines by at least one requester of the plurality of requesters, and wherein the biasing of the retention policy comprises biasing selection of the victim cache line to reduce a difference between the count of insertions of cache lines into the cache storage and the at least one target value for usage of the cache lines.

7. The cache memory as claimed in claim 2, wherein the cache control circuitry is responsive to at least one performance metric received from at least one of the plurality of requesters to bias the retention policy in dependence on the at least one performance metric.

8. The cache memory as claimed in claim 7, wherein the cache control circuitry is responsive to two performance metrics received from two of the plurality of requesters to bias the retention policy to seek to modify a ratio of the two performance metrics.

9. The cache memory as claimed in claim 2, wherein the biasing circuitry is responsive to an elapse of the defined period to update the retention policy in dependence on the count of insertions held by the cache occupancy estimation circuitry.

10. The cache memory as claimed in claim 9, wherein the biasing circuitry is responsive to the elapse of the defined period to update the retention policy in dependence on an average count of insertions determined with respect to a plurality of counts of insertions counted over a multiple of the defined period.

11. The cache memory as claimed in claim 2, wherein the biasing circuitry is responsive to a type of requester when biasing the retention policy to further bias the retention policy in dependence on a type of at least one of the plurality of requesters.

12. The cache memory as claimed in claim 1, the cache memory configured to form part of a cache memory hierarchy with at least one further cache memory interposed between the plurality of requesters and the cache memory.

13. A method of caching data comprising:
   storing cache lines for a plurality of requesters;
   in response to a memory access request from one of the plurality of requesters missing in the cache memory, controlling insertion of a cache line into the cache storage; and
   holding a count of insertions of cache lines into the cache storage for each of the plurality of requesters over a defined period.

14. A cache memory comprising:
   means for storing cache lines for a plurality of requesters;
   means for controlling insertion of a cache line into the cache storage in response to a memory access request from one of the plurality of requesters missing in the cache memory; and
   means for holding a count of insertions of cache lines into the cache storage for each of the plurality of requesters over a defined period.

* * * * *